(12) United States Patent
Jæger et al.

(10) Patent No.: US 10,919,793 B2
(45) Date of Patent: Feb. 16, 2021

(54) TUBULAR ELEMENTS FOR CAKE FILTRATION AND METHOD OF PROVIDING A FILTRATION CAKE

(71) Applicant: Grundfos Holding A/S, Bjerringbro (DK)

(72) Inventors: Tom Jæger, Aalborg (DK); Dominik Marek Dominiak, Lodz (PL); Marcel Gausmann, Aachen (DE)

(73) Assignee: Grundfos Holding A/S, Bjerringbro (DK)

( * ) Notice: Subject to any disclaimer, the term of this patent is extended or adjusted under 35 U.S.C. 154(b) by 471 days.

(21) Appl. No.: 15/540,208

(22) PCT Filed: Dec. 29, 2015

(86) PCT No.: PCT/EP2015/081368
§ 371 (c)(1),
(2) Date: Jun. 27, 2017

(87) PCT Pub. No.: WO2016/107878
PCT Pub. Date: Jul. 7, 2016

(65) Prior Publication Data
US 2017/0355629 A1     Dec. 14, 2017

(30) Foreign Application Priority Data

Dec. 30, 2014  (EP) ..................................... 14200575
Jan. 21, 2015  (DK) .......................... PA 2015 70037

(51) Int. Cl.
*C02F 3/12*     (2006.01)
*C02F 3/30*     (2006.01)
(Continued)

(52) U.S. Cl.
CPC ............ *C02F 3/1221* (2013.01); *C02F 3/006* (2013.01); *C02F 3/06* (2013.01); *C02F 3/109* (2013.01);
(Continued)

(58) Field of Classification Search
CPC ...................................................... C02F 3/1221
See application file for complete search history.

(56) References Cited

U.S. PATENT DOCUMENTS 4,462,916 A * 7/1984 Ecabert .................. B01D 29/15
                                                    210/798
5,824,229 A * 10/1998 Larkey ................. B01D 29/117
                                                    210/741
(Continued)

FOREIGN PATENT DOCUMENTS

CN     201603521 U    10/2010
CN     103582517 A    2/2014
(Continued)

OTHER PUBLICATIONS

Lindeboom, Ralph et al., "Application of high speed imaging as a novel tool to study particle dynamics in tubular membrane systems" Journal of Membrane Science, 2011, pp. 95-99, vol. 368.
(Continued)

*Primary Examiner* — Peter Keyworth
(74) *Attorney, Agent, or Firm* — Knobbe Martens Olson & Bear, LLP

(57) ABSTRACT

The present invention relates to a filtering device for a water treatment system comprising a biological treatment device adapted to provide a sludge from wastewater or filtrated wastewater, and/or the biological treatment device being fluidic connectable to or in fluidic connection with the filtering device for receiving filtrated wastewater from the filtering device and for delivering sludge to the filtering
(Continued)

device. The filtering device is a cake filtration device comprising a fluid penetrable support structure and the support structure is provided as one or more tubular elements having a filtration cake provided on the inside of the fluid penetrable support structure. The filtering has device an inlet being connectable to receive liquid to be filtered so that the flux of liquid to be filtered is from the inside of the support structure, through the filtration cake and to the outside of the support structure thereby providing a filtrate, an outlet for outletting liquid from the interior of the tubular element, and a filtrate outlet for outletting filtrate from the filtering device. The filtration cake is being provided by deposition of solids from the sludge formed in the biological treatment device.

11 Claims, 9 Drawing Sheets

(51) Int. Cl.
*C02F 3/00* (2006.01)
*C02F 3/06* (2006.01)
*C02F 3/10* (2006.01)
*C02F 101/30* (2006.01)

(52) U.S. Cl.
CPC ............ *C02F 3/302* (2013.01); *C02F 3/1215* (2013.01); *C02F 2101/30* (2013.01); *C02F 2203/006* (2013.01); *C02F 2209/001* (2013.01); *C02F 2209/03* (2013.01); *C02F 2303/10* (2013.01); *C02F 2303/20* (2013.01); *Y02W 10/10* (2015.05); *Y02W 10/30* (2015.05)

(56) References Cited

U.S. PATENT DOCUMENTS

| | | | |
|---|---|---|---|
| 5,855,799 A * | 1/1999 | Herrmann | B01D 17/045 210/780 |
| 6,607,660 B2 * | 8/2003 | Morgan | B01D 29/114 210/108 |
| 6,787,035 B2 * | 9/2004 | Wang | C02F 3/12 210/220 |
| 2004/0188361 A1 | 9/2004 | Katsu et al. | |
| 2010/0276377 A1 * | 11/2010 | Knox-Holmes | B01D 29/688 210/780 |
| 2012/0187053 A1 | 7/2012 | Evers | |
| 2014/0076799 A9 * | 3/2014 | Liu | C02F 3/08 210/605 |

FOREIGN PATENT DOCUMENTS

| | | | |
|---|---|---|---|
| DE | 3738253 A1 * | 5/1989 | ........... B01D 29/356 |
| DE | 3738253 A1 | 5/1989 | |
| EP | 0 122 867 A2 | 10/1984 | |
| WO | WO 2012/136214 A1 | 10/2012 | |
| WO | WO 2014/017990 A1 | 7/2014 | |
| WO | WO 2014/102686 A1 | 7/2014 | |

OTHER PUBLICATIONS

International Search Report for PCT/EP2015/081368 dated Mar. 9, 2016.

* cited by examiner

TUBULAR ELEMENTS FOR CAKE FILTRATION AND METHOD OF PROVIDING A FILTRATION CAKE

CROSS REFERENCE TO RELATED APPLICATIONS

This application is a U.S. National Phase Application of PCT International Application Number PCT/EP2015/081368, filed on Dec. 29, 2015, designating the United States of America and published in the English language, which is an International Application of and claims the benefit of priority to European Patent Application No. 14200575.0, filed on Dec. 30, 2014, and Danish Patent Application No. PA 2015 70037, filed on Jan. 21, 2015. The disclosures of the above-referenced applications are hereby expressly incorporated by reference in their entireties.

FIELD OF THE INVENTION

The present invention relates to a filtering device for a water treatment system comprising a biological treatment device adapted to provide a sludge from, water, such as wastewater or filtrated water, such as wastewater, and/or the biological treatment device being fluidic connectable to or in fluidic connection with the filtering device for receiving filtrated water from the filtering device and for delivering sludge to the filtering device. The filtering device is a cake filtration device comprising a fluid penetrable support structure and the support structure is provided as one or more tubular elements having a filtration cake provided on the inside of the fluid penetrable support structure. The filtering device has an inlet being connectable to receive liquid to be filtered so that the flux of liquid to be filtered is from the inside of the support structure, through the filtration cake and to the outside of the support structure thereby providing a filtrate, an outlet for outletting liquid from the interior of the tubular element, and a filtrate outlet for outletting filtrate from the filtering device. The filtration cake is being provided by deposition of solids from the sludge formed in the biological treatment device.

BACKGROUND OF THE INVENTION

A successful filtration of wastewater by use of a filtration cake which is made from sludge material being deposited on a filtration cake support is disclosed in WO 2012/136214. The filtration process reported in this document focussed on a high-performance filtration process of activated sludge, which is at the core of biological wastewater treatment plants. The process disclosed is typically a two stage process—separation of activated sludge to provide an activated sludge supernatant, preferably by means of settling already present in wastewater treatment plants, and filtration of the supernatant through a cake made of sludge flocs originating from the material settled in the separation process.

While the process of WO2012/136214 indeed provides a filtrate of a good quality, wastewater is more and more considered as a rich resource (in term of energy production) and there is a trend these days to shift from energy consumption to energy production in wastewater treatment. However, although it could be seen as attractive to divert the biological material from the aerobic processing tank to a digester (in which the biological material is converted into biogas), it is found that the dry matter content of the material in the aerobic processing tank is low thereby requiring some dewatering prior to digestion which result in that although being attractive, the technical problems related to dewatering renders the use of biological material for producing e.g. biogas less attractive. The filtration cake reported in WO2012/136214 may be mixed in to the part which is digested and if this is performed, the dry matter content will be increased and more biogas will be generated.

However, there still is a need for increasing the dry matter content even further, and today, two approaches are used for increasing the dry matter content:

Improved primary settling: primary settling of raw wastewater is an old, yet effective technique. These days people strive to improve its efficiency by introducing high-rate lamella clarifiers, coagulation etc. Primary settling removes 50-60% of suspended solids (heaviest materials) and 20-30% of BOD (Biological Oxygen Demand—a measure of organic loading).

Fine screening: Pre-filtration of raw wastewater with fine screens removes loading of the rest of the water treatment system to a similar extent as primary settling (>50% TSS, >20% BOD) but with a much lower footprint, reportedly as little as 10% of primary settling. This saves land and enables capacity expansion of the plant.

While the fine screening appears to be the more attractive of the two, problems due to fouling of the filters used in the fine screening are well known but not yet solved problems leading to difficulties in implementing such a fine screening.

EP 0122867 discloses a repeatable rejuvenating filtration system of the pneumatic hydro-pulse type including feeding of a solid/fluid feed slurry to be filtered into operative engagement with the interior of porous wall surfaces of a plurality of open ended tubular filter elements so that filtrate passes outwardly through the walls of the filter elements and the solids are collected as a cake on the interior wall surface. While the disclosed device produces a filtrate, the cake is considered to be a fouling of the filter which fouling must be removed in order to continue filtering. To this end, the device of EP 0122867 is configured as a dead-end filter in which no outlet is provided for the residue (the part remaining after the filtrate is extracted) at an end of the tubular filters distant to the inlet of the tubular filters; thereby no continuously one-way flow of fluid through the tubular filters are provided and the residue is, consequently, flushed out backwardly from the tubular filter elements to remove the cake. Moreover, in EP 0122867 the cake originates from the medium being filtered, and therefore constitutes a fouling layer deposited during the filtration stage.

Hence, an improved fine screening would be advantageous, and in particular a more efficient and/or reliable increase of the dry matter content in material to be digested would be advantageous.

OBJECT OF THE INVENTION

An object of the present invention is to provide an alternative to the prior art.

A further object of the invention may be seen as to improve the filtration of wastewater.

Yet a further object of the invention may be seen as to increase the treatment capacity of a plant treating wastewater.

In particular, it may be seen as a further object of the present invention to provide a filtering device that solves the above mentioned problems of the prior art.

SUMMARY OF THE INVENTION

Thus, the above described object and several other objects are intended to be obtained in a first aspect of the invention by providing a filtering device for use in a water treatment, the water treatment system comprising a biological treatment device adapted to provide a sludge from wastewater or filtrated wastewater, and the biological treatment device being fluidic connectable to or in fluidic connection with the filtering device for receiving filtrated wastewater from the filtering device and/or for delivering sludge to the filtering device, characterized in that the filtering device is a cake filtration device comprising a fluid penetrable support structure, the support structure being provided as one or more tubular elements having a filtration cake provided on the inside of the fluid penetrable support structure, the filtering device having an inlet being connectable to receive liquid to be filtered so that the flux direction of liquid to be filtered is from the interior of the tubular element, through the filtration cake and to the outside of the tubular element thereby providing a filtrate, an outlet for outletting liquid from the interior of the tubular element, a filtrate outlet for outletting filtrate from the filtering device, and a nozzle arranged to introduce gas, such as air, into the interior of the tubular element, the filtration cake being provided by deposition of solids from the sludge formed in the biological treatment device.

The sludge solids (solids from sludge) for e.g the filtration cake is typically provided by the biological treatment device; in embodiments including a digester a fraction of the sludge solids may come from the digester.

The filtrate may also be referred to as pre-filtered wastewater, it having been treated in the pre-filtering device.

In the present context a number of terms are used as would be readily understood by a skilled person. Some of these terms are detailed in the following.

Sludge solids (solids from sludge) is preferably used to means activated sludge flocs and/or coagulated substances, typically, formed in a biological treatment device.

Cake filtration is used to indicate a process in which a liquid is filtrated by flowing through a filtration cake as disclosed herein Filtration cake is used to indicate a layer of solid material deposited on a support structure, which solid material is in particulate form and origins typically as a product of biological treatment of wastewater. As presented herein, the solids are preferably activated sludge flocs and/or coagulated substances.

Cake filtration device is typically used to indicate a device being configured to provide a filtration by use of a filtration cake.

Digested is used to indicate a process in which biological material is converted anaerobically into e.g. biogas.

Fluidic connectable is used to indicate a closeable fluidic connection, typically a tube.

Fluidic connected is used to indicate a fluid connection, typically a tube. Elements may be fluid connected through a fluid connectable connection.

Treating (waste) water is used to indicate a process in which (waste) water is subjected to a biological treatment, such as an aerobic treatment.

Wastewater is used to indicate water containing organic materials and nutrients rendering it unfit for use, consumption or discharge, and therefore requiring treatment.

Water as used herein, e.g. in water treatment system, typically refers to water to be subjected to biological treatment, and includes wastewater in general.

Downstream means placed after a unit or process, and upstream means placed before a unit or process.

Tubular element is used to designate a tube-shaped element. Preferably, the cross section of a tubular element is circular and the tubular element is cylindrical shaped, but other cross sections such as round, polygonal or the like may be used. Typically and preferably, the cross sections along the length of the tubular element are all equal to each other.

Biological treatment is typically used to indicate a biological treatment of water by use of bacteria, i.e. living organisms which metabolises organic matter in the water preferably as opposed to the use of chemicals). Biological treatment is typically about bacteria (sludge) consuming the impurities in water (organics and nutrients) and, with help of oxygen added through aeration, converting them to more bacteria (biomass) and $CO_2$ and $N_2$ (aerobic treatment).

Wastewater to be treated preferably refers to waste water to be subjected to biological treatment, typically in a biological treatment device.

Gas as used in slug of gas typically refers to air, such as atmospheric air (which may be pressurised and/or cleaned from impurities).

Injection and introducing are used interchangably herein in connection with the process of applying gas such as air into a tubular element.

The present invention aims at using "cake filtration" upstream and/or downstream of e.g. biological treatment facility. It has been found in connection with the present invention that by use of such an upstream cake filtration, the filtrate has an improved quality in the sense that it has a lower loading of organics and nutrient than wastewater coming in to the plant. As less organic and nutrient thereby need to be treated in a downstream biological treatment facility, the energy demand for the downstream treatment facility may be lowered and/or the downstream treatment facility's treatment capacity increased.

Further, as the filtration cake is made from biological material and has taken up organics and nutrient from the wastewater in the filtration, the filtration cake has a relatively high dry matter content and the filtration cake may be seen as a "rich fuel" for e.g. a digestion process for producing biogas. Thus, the filtration cake may upon renewal be disposed into e.g. the digester, which result in an overall increase in the biogas (and hence energy) production of the plant increases.

Positioning the cake filtration device downstream of the biological treatment facility improves the quality of secondary effluent and allows to extend the treatment capacity of a plant by enabling higher loads to secondary clarifiers.

Thus, the present invention provides a number of advantages. For instance, when the water into the biological treatment has a lower loading of organics and nutrients, the treatment capacity (e.g. in tons per hour) of a plant may be increased compared to a scenario where no upstream cake filtration is applied. This may be exploited either by retrofitting an upstream cake filtration in an existing treatment facility to increase the capacity of the facility without the need for changing the facility as such, or be exploited in a plant design phase to provide a more efficient treatment facility with less foot print, energy foot print etc.

Accordingly, cake filtration as a pre-treatment of incoming wastewater can shift the energy balance of the plant from energy consumption towards energy production, which is a popular trend these days. The present invention has the advantage, that the filtration cake is made from activated sludge present in the treatment plant and use it for filtration of raw wastewater coming into the treatment plant. Thereby, the stream used for building the filtration cake originates typically from the treatment plant itself after the wastewater has been exposed to a biological treatment process whereas the stream being pre-filtered originates typically from wastewater not yet exposed to a biological treatment. In case of down-stream positioning of the cake filtration device, the stream used for building the filtration cake also origins typically from the treatment plant itself after the wastewater has been exposed to a biological treatment process whereas the stream being filtered is secondary effluent, which has already been through biological treatment in the biological treatment device.

Preferably, a filtering device may be characterized by the filtering device further comprises a fluid tight casing encapsulating the support structure and providing a cavity outside the support structure in fluid communication with the filtrate outlet.

Preferably, each of the tubular elements may comprise an inner layer and an outer layer being concentrically arranged, wherein each layer comprises through-going openings, and the through-going openings in the inner layer has a larger cross sectional area than the through-going openings in the outer layer.

The volume of the through going openings in the inner layer may preferably be selected to carry a filtration cake with a dry matter content of 0.01-0.5 kg/m$^2$, where the area is determined at the inner most part of the inner layer.

Preferably, the through going openings in the inner layer are uniform throughout the length of the support structure. The inner layer may preferably be formed by a mesh and the outer layer may be formed by a mesh, wherein the mesh of the inner layer is coarser than the mesh of the outer layer.

The depth of the through going openings of the inner layer may preferably be smaller than 3 mm, such as smaller than 2 mm, preferable smaller than 1 mm.

Preferable, the through going openings in the inner layer are non-uniform. The through going openings in the inner layer may preferably be arranged along spiral generatrixes.

The thickness of the filtration cake on the tubular elements is preferably less than 3 mm, such as less than 2 mm.

Preferably, the tubular element(s) is(are) cylindrical element(s) having an internal diameter less than 15 mm, such as less than 12 mm and even less than 10 mm.

In preferred embodiments of a filtering device, a plurality of tubular elements are arranged in parallel and have a common inlet for receiving wastewater to be treated. Preferably, the plurality of tubular elements are arranged in a common filtering device.

During filtration, it is preferred that the pressure difference across the support structure is between 10 and 500 mbar, such as between 50 and 200 mbar.

The deposited solids are preferably provided from an activated sludge being provided by separating the sludge formed in the biological treatment device by use of a separator into an effluent and activated sludge having a higher dry matter content than the effluent.

In a second aspect the invention relates to a water treatment system comprising a filtering device according to according to the first aspect, characterized by the filtrate outlet (9) of the filtering device (1) is fluidic connected or fluid connectable to a downstream biological treatment device (1).

Preferably, such a water treatment system comprising a filtering device (1) may be characterized by the inlet of the filtering device for receiving liquid to be filtered is fluidic connected or fluid connectable to an upstream biological treatment device. The fluidic connectable connections may preferably comprise valves for controlling the flow through such connections.

The water treatment system may preferably further comprise a screening device arranged upstream of the filtering device, said screening device being adapted to carry out a filtering-out of objects above a pre-selected size, such above 2 mm, preferably above 5 mm, such as above 10 mm, from the wastewater prior to be fed into the filtering device.

Preferably, the water treatment system may further comprise a separator separating the sludge formed in the biological treatment device into an effluent and activated sludge having a higher dry matter content than the effluent.

In a third aspect the invention relates to a method for providing a filtration cake of a support structure according to the first and/or second aspect of the invention characterised by, feeding sludge formed in a biological treatment device into the interior of the tubular element(s), an accumulation phase (A) comprising accumulating activated sludge flocs and/or coagulated substances on the interior surface of the tubular elements by inducing a pressure difference to generate a flow of sludge, towards and through fluid penetrable support structure until a layer of flocs has been established on the interior surface of the support structure, a compression phase (B) comprising increasing the pressure difference to a level being sufficient to compress the layer of accumulated flocs on the support structure into a filtration cake, wherein, the filtration cake being provided from activated sludge flocs and/or coagulated substances formed in a biological treatment device arranged upstream or downstream of the support structure.

The method may preferably be characterized by the pressure difference during the accumulation phase (A) is below 1 bar, such as below 0.5 bar, or even lower than 0.1 bar, and the pressure difference during the compression phase (B) is above the pressure difference of the accumulation phase (A) and below 2 bar, such as below 1 bar, or even below 0.3 bar. Preferably, the pressure difference during the accumulation phase (A) is constant over time or increased over time.

The pressure difference during the accumulation phase (A) and/or the compression phase (B) may preferably be provided by a hydrostatic pressure difference, e.g. provided by arranging an outlet of the filtering device at lower level than an upper surface of the sludge, by pressurising the sludge, and/or providing a suction at the outlet.

The filtering device after having been in an operation mode (C) for a period, may preferably be renewed by removing the filtration cake, and the accumulation phase (A) and compression phase (B) are carried out again.

Preferably, the sludge fed into the interior of the tubular elements may be provided by separating the sludge formed in the biological treatment device by use of a separator into an effluent and activated sludge having a higher dry matter content than the effluent.

In a fourth aspect, the invention relates to a method of removing a filtration cake from a filtering device). The filtering device is a cake filtration device comprising a fluid penetrable support structure, wherein the support structure is being provided as one or more tubular elements having a filtration cake provided on the inside of the fluid penetrable support structure, characterized by the tubular element(s) being vertically arranged, and the method comprising introducing gas bubbles, such as air bubbles, by use of a nozzle (30) into the tubular element(s) at a lower end thereof, and arresting the introduced gas bubbles inside the tubular element(s) by closing the upper end of the tubular element(s)

until a slug of gas has formed occupying the entire void inside the tubular element(s).

The filtering device in according to the fourth aspect if preferably a filtering device according to any of the preceding aspects.

The gas bubbles may preferably be arrested by closing the inlet of the filtering device for receiving liquid to be filtered, and alternatively or in combination by further comprising preventing fluid flow through the fluid penetrable support structure.

The prevention of fluid flow through the support structure may preferably be provided by establishing a zero pressure gradient between the interior and outside of the support structure.

Subsequently to the formation of slug of gas which occupies the entire void in the tubular element(s) the method may preferably comprise:

establish a flow of sludge inside the tubular element(s) along its longitudinal axis from bottom to top of the tubular element(s), while injecting gas, preferably atmospheric air, in an amount to allow formation of portions of sludge neighbouring by slugs of gas, preferably slugs of gas.

The injection of gas may preferably be done by the use of the nozzle arranged to introduce gas, such as air, into the interior of the tubular element as disclosed above.

The method may preferably further comprise subsequently to injecting gas, establishing a back-flow, preferably of filtrate, into the inside of the tubular element(s).

The first, second, third and fourth aspect of the present invention may each be combined with any of the other aspects. These and other aspects of the invention will be apparent from and elucidated with reference to the embodiments described hereinafter.

BRIEF DESCRIPTION OF THE FIGURES

The present invention will now be described in more detail with regard to the accompanying figures. The figures show one way of implementing the present invention and is not to be construed as being limiting to other possible embodiments falling within the scope of the attached claim set.

FIG. 2 shows the support structure in a cross sectional view along line A-A shown in the upper part of FIG. 2, in FIG. 5 the following use scenarios are illustrated: top part—filtration; middle part—filtration cake removal; bottom part—filtration cake formation, FIG. 8 is a schematical illustration of steps involved in the removal and build-up of a filtration cake on support structure.

DETAILED DESCRIPTION OF PREFERRED EMBODIMENTS

Figure 1A:
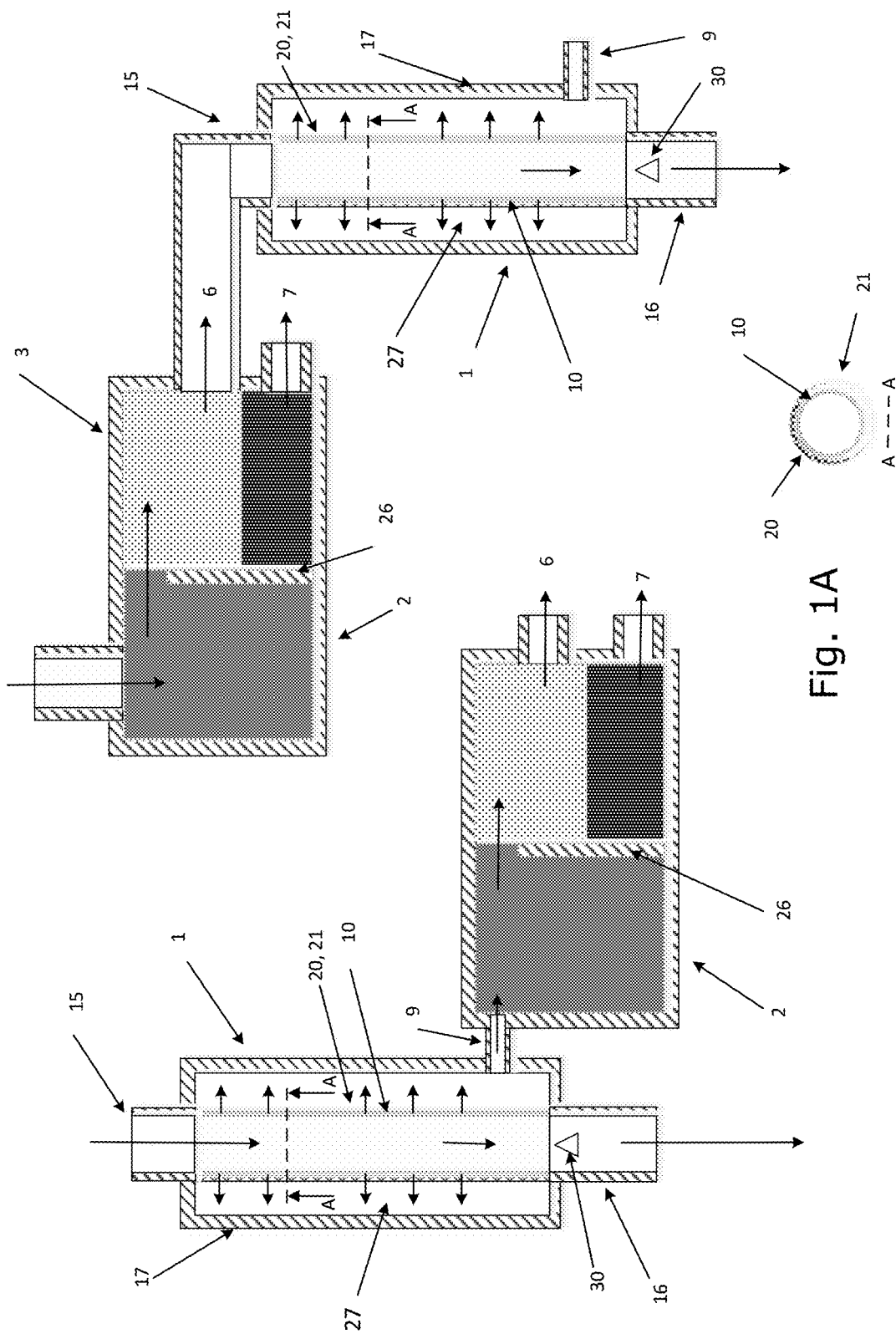
FIG. 1 is a schematical illustration of a water treatment system according to a first embodiment of the invention, in left hand side of FIG. 1A, the filtering device is arranged upstream of the biological treatment system and in the right hand side of FIG. 1A, the filtering device is arranged downstream of the biological treatment device.
in FIG. 1B the filtering device is illustrated schematically with fluid connections in embodiments comprising a digester, upper part of FIG. 1B illustrate the filtering device upstream of a biological treatment device and in lower part of FIG. 1B illustrate the filtering device downstream of a biological treatment device.

Reference is made to FIG. 1 which is a schematical illustration of a water treatment system in which a filtering device 1 according to a first embodiment of the invention is implemented. The water treatment system comprises a filtering device 1 receiving a liquid to be filtered and provides a filtrate. As disclosed in FIG. 1, the liquid to be filtered may be wastewater (not yet being biological treated) and it may be secondary effluent (supernatant of sludge mixed liquor) produced in a biological treatment device 2 (also containing a separation step).

A water treatment system in which a filtering device 1 according to the present invention may be used, may typically comprise as disclosed in FIG. 1 a biological treatment device 2 adapted to provide a sludge from wastewater or filtrated wastewater, and the biological treatment device 2 being fluidic connectable to or in fluidic connection with the filtering device 1 for receiving filtrated wastewater from the filtering device 1 and for delivering sludge to the filtering device 1. As disclosed herein the connection between the filtering device 1 and the biological treatment 2 device may be fluidic connectable, which mean that the fluid connection may be shut-off.

The filtering device 1 is a cake filtration device comprising a fluid penetrable support structure 20, the support structure 20 being provided as one or more tubular elements 21. In FIG. 1 only a single tubular element 21 is shown. The support structure has a filtration cake 10 provided on the inside of the fluid penetrable support and the filtering device 1 having an inlet 15 being connectable to receive cake building material and liquid to the filtered so that the flux direction of liquid to be filtered is from the inside of the support structure 20, through the filtration cake 10 and to the outside of the support structure 20. Thus, the liquid after having passed through the fluid penetrable support and the filtration cake 10 is termed a filtrate.

As also shown in FIG. 1, the filtering device 1 has an outlet 16 for outletting liquid from the interior of the tubular element 21 (this liquid may be referred to as a residue from the filtration), and a filtrate outlet 9 for outletting filtrate from the filtering device 1.

As disclosed herein, the filtration cake 10 may typically be provided by deposition of solids from the sludge formed in a biological treatment device 2.

A nozzle 30 is arranged at the lower end of the tubular element 21 for introducing air into the tubular element 21—the purpose of introducing air will be disclosed further in relation to FIG. 8. The actual position of the nozzle 30 may vary, although it is preferred to arrange it at the lower end of the tubular element 21 (the tubular element 21 is in such situation arranged with it longitudinal axis parallel to the gravity) such that gas may flow into the tubular element and form a slug of gas, such as a slug of air, which gradually fills the void 28 of the tubular element 21 when the upper end thereof is blocked so that the gradually filling acts as a piston pushing material of the filtration cake out.

Further, the nozzle 30 may be a conventional nozzle—or a number of nozzles—which is suitable for introducing gas in the desired manner, which preferably is to introduce gas in manner where gas bubbles are formed at the nozzle 30 and which gas bubbles rises upwardly in the tubular element 21.

As further illustrated in FIG. 1A (left hand side), the outlet 9 leads to a biological treatment device 2. The liquid after being processed in the biological treatment device 2 flows into a separator 3 in which the liquid is separated into what is termed an effluent 6 (typically being activated sludge supernatant) and return activated sludge 7 containing activated sludge flocs.

Right hand side of FIG. 1A shows the situation where the filtering device 1 is arranged downstream of (i.e. after) a biological treatment device 2. In this embodiment, the effluent 6 goes into the filtering device 1 and the return activated sludge 7 is fed into biological treatment device 2 (not shown) and also used to establish cake in the filtering device 1 (not shown) Outlet 16 is shut off during operation, which is carried on in dead-end mode.

It is noted that in the embodiment shown in FIG. 1A, the biological treatment device 2 and the separator 3 is illustrated as being embodied in a container with a separating wall 26 for simplicity only.

In a preferred embodiment and as illustrated schematically in FIG. 1, the filtering device 1 further comprises a fluid tight casing 17 encapsulating the support structure 20 and thereby providing a cavity 27 outside the structure 20 in fluid communication with the filtrate outlet 9. This cavity 27 is separated from the outlet 16 by the support structure 20. The interior of the support structure 20 is typically in fluid communication with the inlet 15 for receiving the liquid to be filtered and outlet 16 to make it possible to establish fluid circulation within the support structure 20 (as shown in FIG. 1).

Figure 1B:
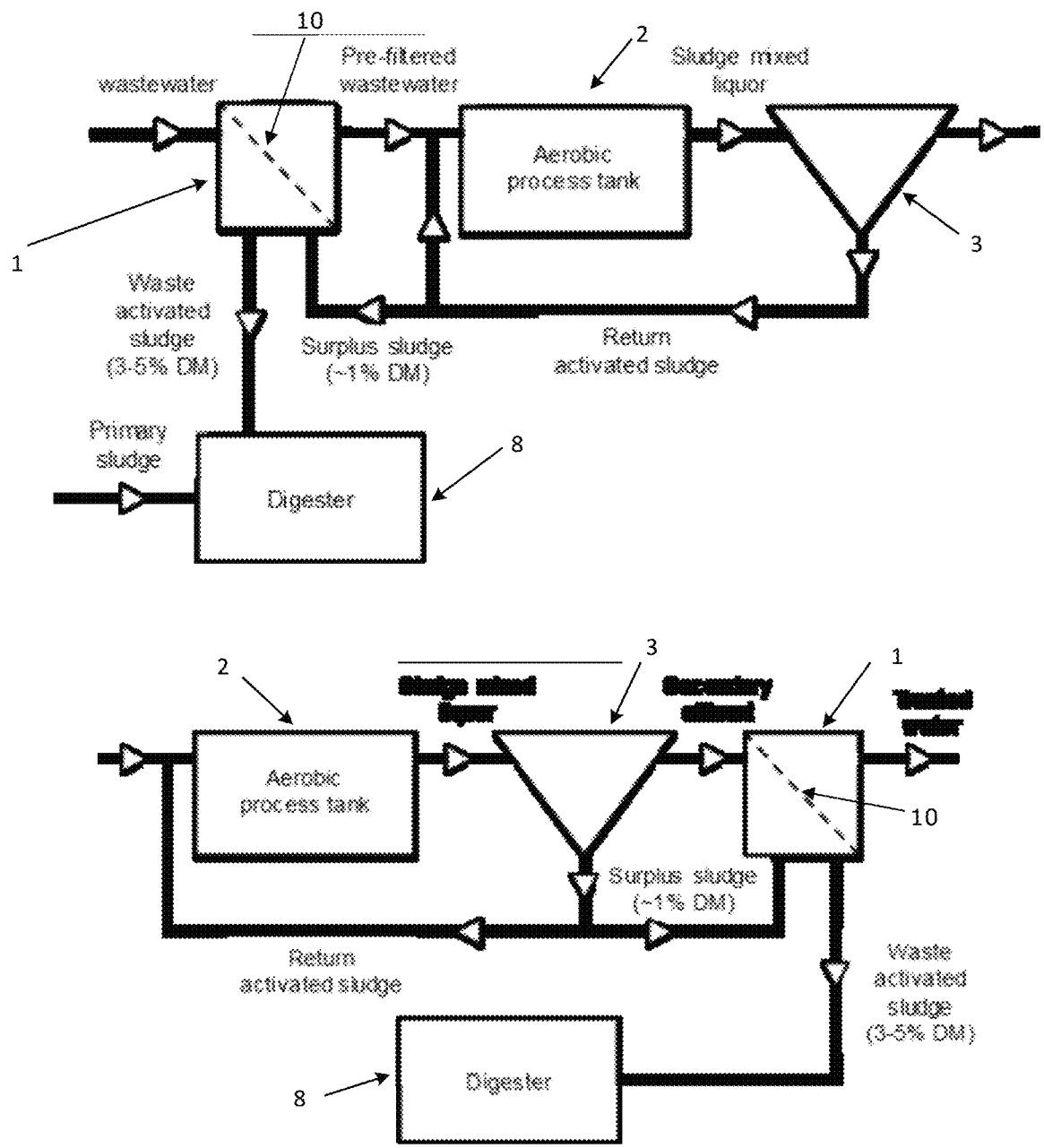

Referring to FIG. 1B, the filtering device 1 is illustrated in embodiments including a digester 8. Upper part of FIG. 1B shows an embodiment in which the filtering device 1 is arranged upstream of the biological treatment device 2, and in FIG. 1B lower part the filtering device 1 is arranged downstream of the biological treatment device 2 with a separator 3 arranged in between, so that the filtering device 1 filters the effluent from the separator 3.

It is noted that the separator 3 and digester 8 are considered optionally elements of the present invention.

Figure 4:
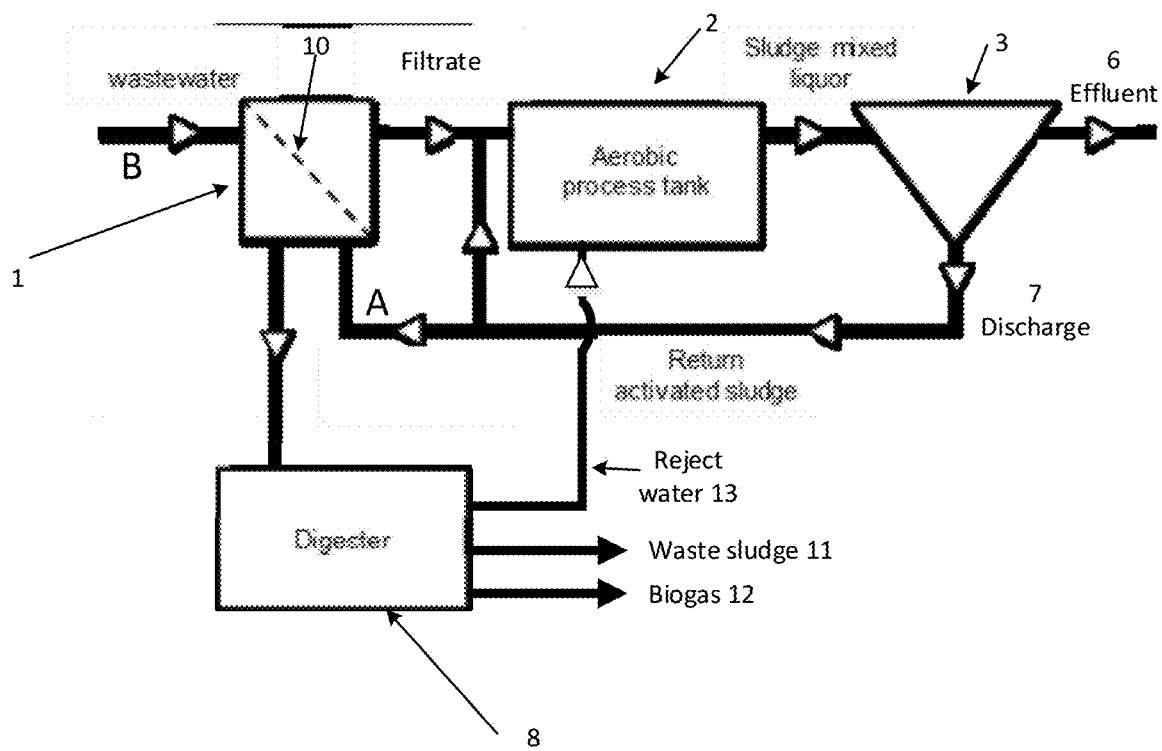
FIG. 4 is a schematical illustration of a water treatment system according to a further preferred embodiment of the invention.

Referring to FIG. 4, a water treatment system according to preferred embodiments of the present invention may be seen as taking-in activated sludge from a conventional sludge loop in the wastewater treatment system and building a filtration cake 10 with it (stream A in the FIG. 4). Then, the water treatment plant filters wastewater coming into the plant through the cake (stream B in the FIG. 4 below). The thereby pre-filtered wastewater (filtrate) goes to the biological treatment device 2 as it would normally do, but now the pre-filtered wastewater has a much lower loading of matter to be filtered since organics and nutrients are filtered away by the filtration cake and deposited in the filtration cake. This means that the biological treatment device 2 can be smaller, aeration requirement is smaller, and alkalinity dosing requirement is smaller. The spent (i.e. used) cake, loaded with organics and nutrients from wastewater, may advantageously be directed into a digester 8 (see FIG. 4).

It may be important to realize that stream A (see FIG. 4)—surplus activated sludge—would go to a digester anyway. In conventional treatment facilities, it would however need to be dewatered to 3-5% dry matter (it normally is approx. 0.5% dry matter) by special dewatering equipment (usually centrifuges or belt presses helped by coagulation). With the preferred embodiments of the present invention the cake filtration dewaters 'for free' and without coagulants, and the cake is a compact structure of high dry matter content and may be disposed in a way that is maintains 3-6% DM content.

In embodiments where the filtration cake ends up in the digester 8, its biogas potential is higher than that of ordinary sludge, because the spent filtration cake is loaded with organics and nutrients. More biogas can create more energy. Thus, little energy is used to pre-filter wastewater, and also lower energy used to treat the pre-filtered wastewater biologically. This, combined with more energy production from biogas, means that the energy balance shifts from consumption side to production side. This is the goal of using this invention.

Figure 2:
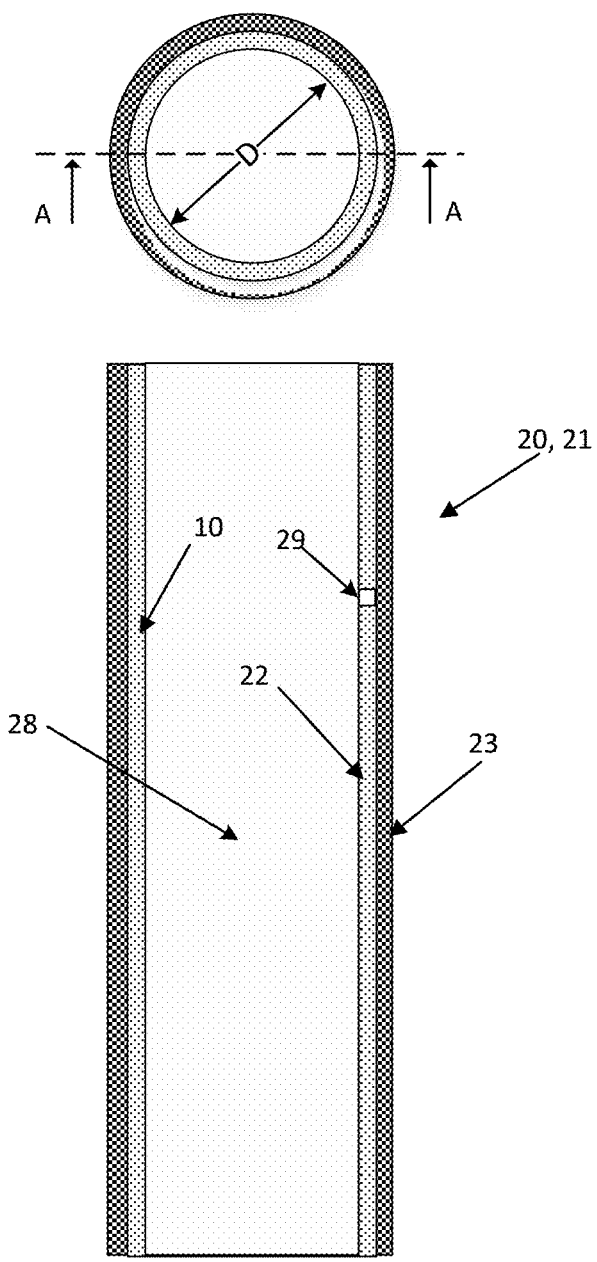
FIG. 2 is a schematical illustration of a support structure on which a filtration cake is to be formed according to a preferred embodiment of the invention; upper part of FIG. 2 shows the support structure in an end-view and lower part

Reference is made to FIG. 2 which illustrates a preferred embodiment of a support structure 20 being provided as one or more tubular element 21 (in FIG. 2 only a single support structure 20 is shown).

As outlined herein, the interior of the one or more of the tubular elements 21 forms, during filtration, an upstream surface (inside surface) of the support structure 20 on which the filtration cake 10 is provided, and the interior of the one or more of the tubular elements 21 is fluidic connectable to or in fluid connection with an inlet receiving wastewater to be treated. By upstream surface is meant that the flux direction through wall of the support structure 20 goes from inside to outside.

A tubular element 21, as shown in FIG. 2, comprises an inner layer 22 and an outer layer 23 being concentrically arranged, wherein each layer comprises through going openings, and the through going openings in the inner layer has a larger cross sectional area than the through going openings in the outer layer. Further, as the layers has a thickness, the openings in e.g. the inner layer 22 forms pockets 29 in which material forming the filtration cake may be deposited (in FIG. 2 a single pocket 29 is schematically disclosed as a square). The openings provided in the outer layer 23 are selected sufficiently small to arrest the material from which the filtration cake 10 is formed in the pockets 29 of the inner layer 22. In embodiments comprising more than one tubular element 21, each of the tubular elements 21 may be formed as outlined in FIG. 2.

The pockets may typically have dimensions within the following ranges: cross sections from 2×2 to 10×10 mm. Pockets formed as bands, could be larger, such as a width of 50 mm, preferably between 5-100 mm, such as between 10-50 mm. Depth of the pockets could preferably be between 1 and 10 mm, preferably between 2 and 5.

During use of the tubular elements 21, it is preferred to provide the filtration cake 10 with thickness less than 3 mm, such as less than 2 mm. This will—as indicated in e.g. FIGS. 2 and 8A—provide a filtration cake 10 which extends into the internal void 28 of the tubular element 21 as the depth of the pockets 29 in the inner layer 22 typically is selected smaller than the thickness of the filtration cake 10. A single pocket 29 is schematically shown FIG. 2. A large number of pockets 29 are situated side-by-side in the inner layer 22. The pockets 29 can be circular shaped, square shaped, or rectangular, or even polygon shaped (in cross section). Although a tubular element 21 may be provided with any desired cross section, it is preferred that such a tubular element is a cylindrical element having an internal diameter, D in FIG. 2, less than 15 mm, such as less than 12 mm and even less than 10 mm. The length, L in FIG. 2, of the tubular element 21 may preferably be within the range of 0.5 to 2 m, such as within the range of 0.75 to 1.5 such as having a length of 1 m. However, other lengths are applicable.

The tubular element 21 may preferably be made from metal such as stainless steel, that is the inner layer 22 and outer layer 23 both being made from metal such as stainless steel. However, other materials and combinations of materails may be used for the tubular element 21 and may be selected so that the structural rigidity of the tubular element 21 is sufficient to withstand the fluid dynamic forces acting on the tubular element 21 during use so that geometrical distortion of the tubular elements 21 is avoided. Thus, considered within the reach of the invention are tubular elements 21 made from a composite material, such as a composite of carbon fibres, Kevlar fibres, glass fibres bonded by resin, epoxy or the like. Further, tubular elements 21 may also be made from plastic. Combinations of e.g. one of layers made of metal and the other layer made of composite material are also considered within the scope of the invention. Further, hybrid materials in which composite, plastic and metal (and combinations thereof) is/are used to form one or both layers are also considered within the scope of the invention.

In order to increase the filtering capacity, it is often preferred to use a plurality of tubular elements 21 and arrange them in parallel having a common inlet for receiving wastewater to be treated.

Figure 3:
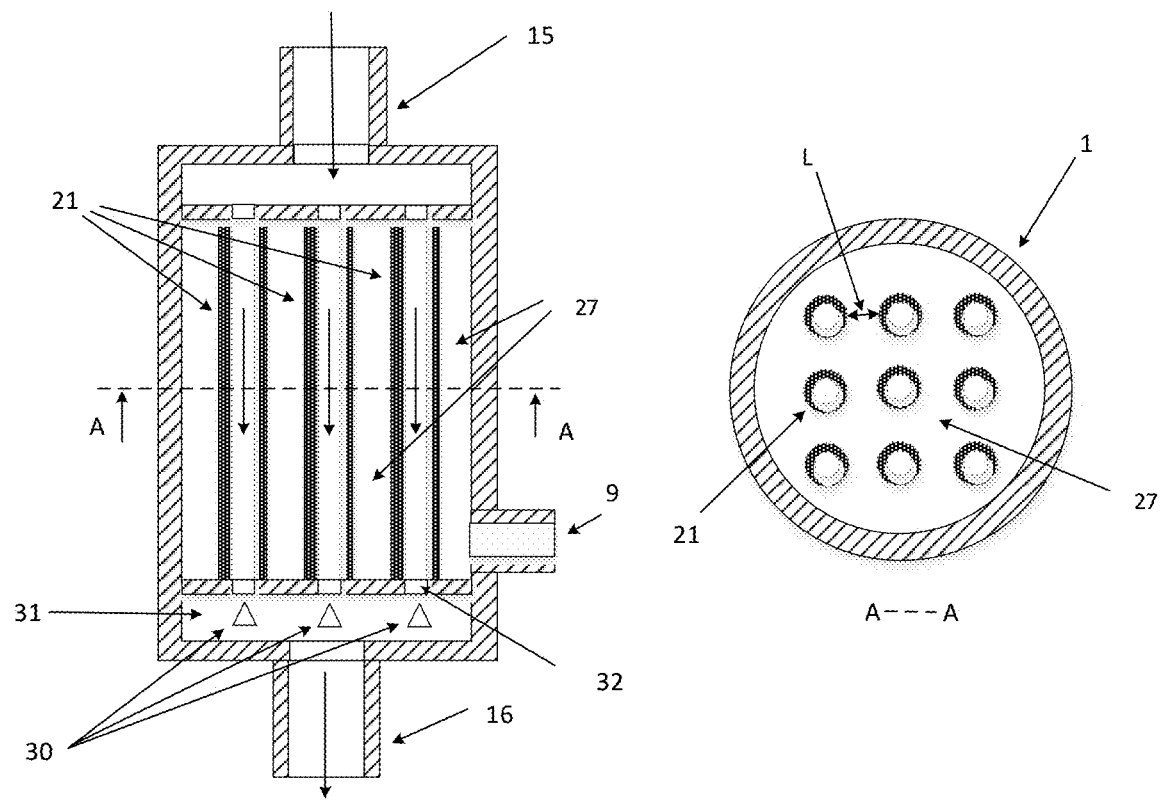
FIG. 3 is a schematical illustration of a plurality of filtering device according to a preferred embodiment in which a plurality of tubular support elements are arranged in parallel.

One such example is disclosed schematically in FIG. 3 in which the plurality of tubular elements 21 further are arranged in a common filtering device 1. It is noted that the mutual arrangement of the tubular elements 21 may be selected so as to arrange as many as possible tubular elements 21 inside the filtering device 1, while still allowing for a transportation of filtrate out from the filtering device 1. The distance L (see FIG. 3) between two neighboring tubular elements 21 is preferably between 1-10 mm or may even be between 20-100 mm. It is noted that in preferred embodiments, a number tubular elements 21 are tightly in module in manner allowing the filtrate to flow out of the module.

A nozzle 30 may preferably be arranged in a manner similar to what was disclosed in connection with FIG. 1A. In one embodiments, one or more nozzles 30 is arranged in the manifold 31 formed in the filtering device 1 and preferably a nozzle 30 is arranged right below each of the openings 32 in the manifold 3 (as shown in FIG. 3). In other embodiments (not shown), one or more nozzle 30 may be arranged in the outlet 16.

During filtration, it is preferred to provide a pressure difference across the support structure 20 between 10 and 500 mbar, such as 50 and 200 mbar.

As outlined herein, the deposited solids of the filtering device may advantageously be provided from an activated sludge. This activated sludge may preferably be provided by separating the sludge formed in the biological treatment device (2) by use of a separator (3) into an effluent and activated sludge having a higher dry matter content than the effluent. It is then solids of the activated sludge which is deposited.

As outlined herein, the filtering device is designed to be used in a water treatment system for treating wastewater and at least two possible positions in such a treatment system is found advantageous for the filtering device 1. As illustrated in FIG. 1, left hand side, a water treatment system comprising a filtering device 1 according to the present invention may have the filtrate outlet 9 of the filtering device 1 in fluidic connection or fluid connectable to a downstream biological treatment device 1. Alternatively, right hand side of FIG. 1, the inlet 15 of the filtering device 1 for receiving liquid to be filtered is in fluidic connection or fluid connectable to an upstream biological treatment device 1 (which also contains means of sludge separation and therefore generation of supernatant).

It is noted that further elements such as a clarifiers, thickener, separator or the like are omitted from the present disclosure for clarity reasons only, and that a filtering device 1 may be located both upstream and downstream of the biological treatment device. When a filtering device 1 is located upstream of the biological treatment device 2, the liquid fed from the filtering device 1 to the biological treatment device 2 is preferably the filtrate and when the filtering device 1 is located downstream of the biological treatment device 2, a separator 3 may advantageously be arranged downstream of the biological treatment device 2 (or form part of the biological treatment device 2) to separate from the sludge a supernatant which is the part being filtered in the filtering device 1.

Reference is made to FIG. 4 which shows schematically a water treatment system according to a preferred embodiment of the invention. As shown in FIG. 4, the filtration element 1 is arranged upstream of a biological treatment device 2; however, the filtration element 1—or a further filtration element 1—may be arranged downstream of the separator 3. In order to provide material from which the filtration cake 10 is formed, the support structure 20 is fluidic connectable to receive activated sludge, preferably activated sludge flocs, so as to deposit material of the biologically treated wastewater on the upstream surface of the support structure 20, to provide a filtration cake made from sludge solids formed in the biological treatment device 2 and which filtration cake is used for filtering wastewater in the filtering device 1. As shown in FIG. 4, the biological treatment device 1 is preferably an aerobic process tank and its associated settling tank.

The biological treatment device 2 typically provides sludge mixed liquor which beneficially may need a further treatment before being e.g. disposed. A water treatment system may to this (and other purposes as well) further comprise a separator 3 being fluidic connectable to or fluidic connected to the biological treatment device 2 so as to receive sludge from the biological treatment device 2. Again, fluidic connectable refers to situations where the connection is closeable. The sludge may preferably be sludge mixed liquor flowing out from the biological treatment device 2 and the separator 3 separates the sludge into at least two fractions, an effluent 6 and a discharge 7. The separator 3 is adapted to provide the effluent 6 with a lower content of solids than the discharge 7.

The separator 3 is advantageously formed as a sedimentation device 3 in which the discharge 7 (when inflow is sludge mixed liquor) is sludge with solids, preferably being activated sludge, and the effluent 6 is activated sludge supernatant. The separator 3 is as indicated in FIG. 4 fluidic connectable to or in fluidic connection with the biological treatment device 2 for feeding the discharge to the biological treatment device 2.

In embodiments including a separator 3, it is preferred that the filtering device 1 is fluidic connectable to or in fluidic connection with the separator 3 so as render it possible to feed the discharge 7 from the separator 3 towards the internal surface of the of the tubular element(s) 21. Thereby the filtration cake can be formed by deposition of material formed in the biological treatment device 2 and separated off in the separator 3 to form the discharge. However, forming the cake with activated sludge from the biological treatment device 2 is also possible.

While the filtration cake has shown to provide an excellent filtration upstream of the biological treatment device 2, it has been found that e.g. the effluent 6 may need a further filtering before leaving the water treatment system. In such situations, a water treatment system may comprise a further filtering device 1 arranged to filter effluent from the separator 3 and the filtering device 1 may be of the same kind as the filtering device 1 arranged upstream of the biological treatment device 2, that is having a filtration cake provided on a fluid penetrable support structure of the filtering device 1. Also for this filtering device 1, the filtration cake is provided on an upstream surface (the inner surface) of the support structure relatively to the flux direction of effluent through the filtration cake and the filtration cake being provided by deposition of solids from the sludge formed in the treatment device 2.

As shown in FIG. 4, a water treatment system may comprise a digester 8 for converting organic material of the wastewater into biogas. The digester 8 is typically of a kind which converts biological material into biogas, resulting in three streams out from the digester: biogas 12, waste sludge 11 and reject water 13.

Reject water is preferably fed into the biological treatment device 2 while the waste sludge 11 is disposed of. Biogas 12 is collected and used as a fuel.

As indicated above, the relatively high dry matter content of the filtration cake 10 makes it highly suitable for the conversion process in the digester 8, and the digester 8 is therefore fluidic connectable with or in fluidic connection with the filtering device 1 for receiving filtration cake 10 containing material filtered out from the wastewater (the filtration cake 10 also contains the material from which is was formed prior to filtration).

The digester may be devised as a confined space having an outlet for gas (biogas 12) produced, an outlet for waste sludge 11 and an outlet for rejected water 13.

As the rejected water from the digester 8 may be useful for the processes in the biological treatment device 2, the outlet for rejected water 13 is fluidic connectable to or in fluidic connection with the biological treatment device 2 for feeding rejected water from the digester 8 to the biological treatment device 2.

In the water treatment system disclosed herein, the deposited solids forming the filtration cake are preferably sludge solids, preferably being activated sludge flocs.

Figure 5:
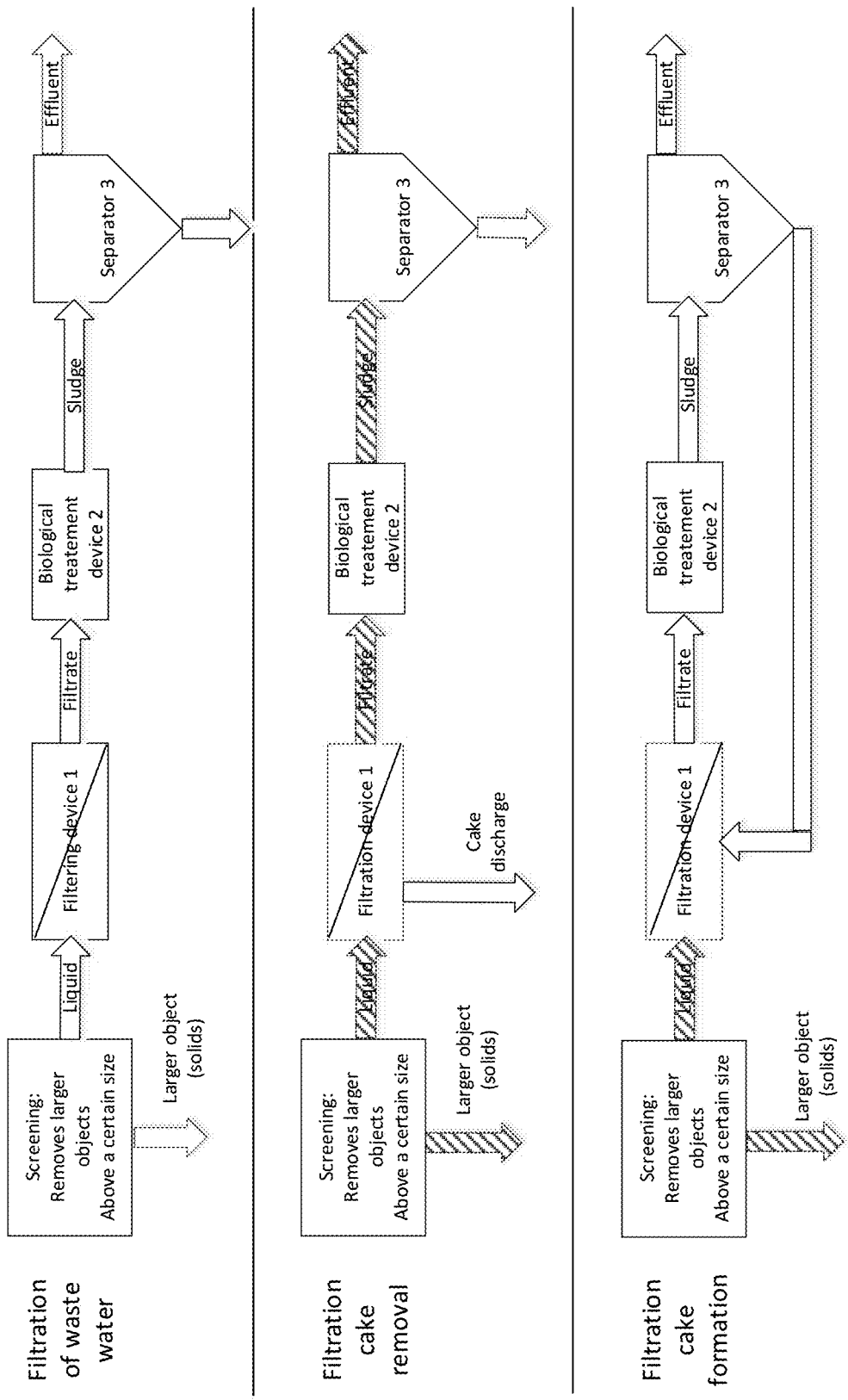
FIG. 5 is a schematical illustration of the use of a water treatment system according to a preferred embodiment of the invention.

Reference is made to FIG. 5 which indicate three different uses of the water treatment system of FIG. 4 (please note that the digester 8 has been left out from the figures and that a screening device is arranged as an upstream device filtering larger particulates from incoming wastewater, which screening device may be left out). The filtering device 1 is shown arranged upstream of the biological treatment device, but can be arranged downstream. In FIG. 5 the following use scenarios are illustrated: top part—filtration of wastewater; middle part—filtration cake removal; bottom part—filtration cake formation.

As also seen in FIG. 5 is that some of the fluidic connections are shut-off which is shown by hatched and white arrows with dotted outer contours. In the top part of FIG. 5, the wastewater is screened and flows into the filtering device 1 containing the filtration cake 10. After filtration the filtrate flows into the biological treatment device 2 and leaves the biological treatment device 2 and sludge. The sludge is separated in two fractions (as outlined above) to provide a discharge and a effluent.

In the middle part of FIG. 5, the filtration cake 10 is removed, and no fluid is filtered. The removed filtration cake is discharged into the digester 8.

In the bottom part of FIG. 5, the filtration cake 10 is removed which includes feeding the discharge from the separator to the upstream surface of the support structure; this will be disclosed in further details below.

Figure 6:
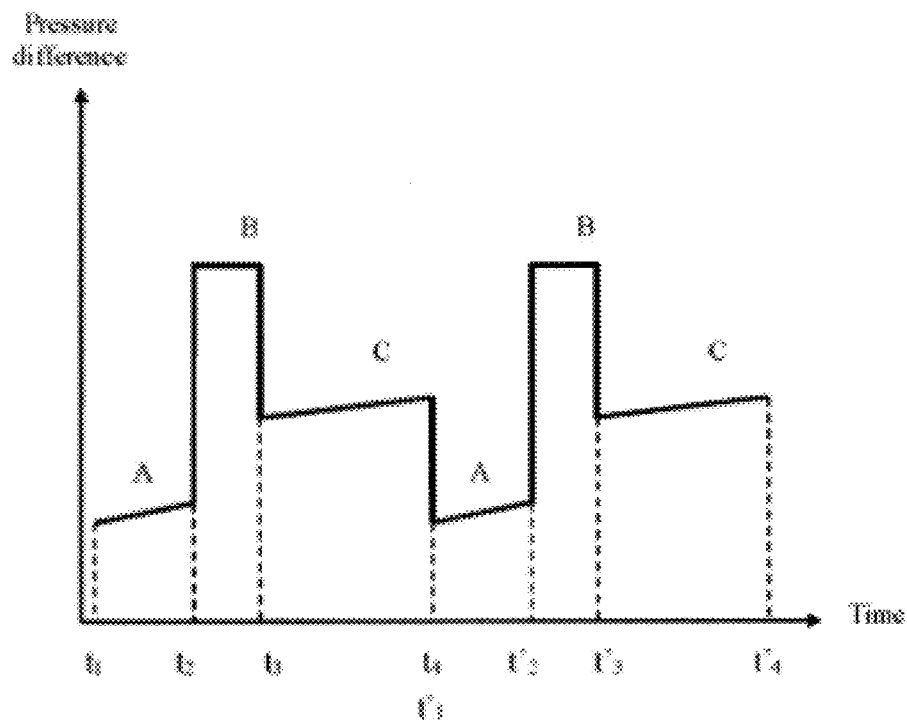
FIG. 6 is a chart indicating an imposed pressure difference profile over the support structure 20 during a filtration cake design phase (A, B) and filtration phases (C) of the system which filtration cake design phase (A, B) typically takes place in the beginning of each filtration cycle and which phases typically constitutes a filtration cycle.

Reference is made to FIG. 6 which indicates different steps involved in a preferred embodiment of forming the filtration cake 10, which includes the step compressing the filtration cake 10 in a filtration cake design phase (A, B) prior to filtration of the wastewater or sludge.

The filtration cake 10 can be perceived as being provided during a filtration cake design phase. Upon initiation of the provision of a filtration cake 10, the filtration cake design phase comprising, with reference to FIG. 6, an accumulation phase A from time $t_1$ to $t_2$ and a compression phase B from time $t_2$ to $t_3$. During phase A, the pressure difference is relatively low, that is typically in the order of 0.01 to 0.1 bar and activated sludge flows towards the support structure 20. At the very beginning of the filtration cake 10 design phase, activated sludge flocs and other particles having a size being too large to go through the openings in the support structure 20 are arrested by the support structure 20.

During the accumulation phase A at least, activated sludge flocs having a size allowing them to pass through the mesh or the not yet fully designed filtration cake 10 go through the support structure 20 and in order to avoid discharging these flocs to the environment, the fluid going through the support structure 20 is typically recycled to the biological treatment device 2.

Once flocs have begun to be arrested on the support structure 20 and activated sludge flows towards the support structure 20, a further accumulation of flocs on the support structure occurs. This further accumulation is continued until a pre-determined thickness of accumulated activated sludge flocs has been reached ($t=t_2$). The point in time at which this occurs may be determined in a number of ways. One possible way is to monitor the pressure drop over the support structure 20 and experimentally determine a correlation between the filtration cake of accumulated activated sludge flocs and the pressure drop, so that phase A is ended once a certain pressure drop occurs over the support structure 20. In FIG. 6, this is indicated by the pressure curve in phase A being sloped. Another option is to monitor flow and sludge suspended solids concentration and calculate the cumulative filtrate during the formation phase, thereby calculating the deposited amount of dry matter in real time, then stopping at a predefined value.

At the end of phase A ($t=t_2$), the filtration cake 10 has been formed, but is still mechanically quite unstable and the filtering characteristics of the filtration cake 10 may still not be as desired. During compression phase B (from $t_2$ to $t_3$), the pressure difference over the support structure 20 is at an elevated level providing a compression of the filtration cake 10. The pressure difference needed for this compression may vary, but may typically be in the range of 0.01 to 1 bar measured across the support and the filtration cake 10. The compression is carried out for a certain time, preferably being determined experimentally, with the aim of compressing flocs in the entire filtration cake 10. At the end of phase B ($t=t_3$), the filtration cake 10 comprising accumulated and compressed activated sludge flocs and the support structure 20 is ready for filtration and filtration phase C ($t>t_3$) is initiated. Once phase B is ended, the pressure difference is lowered to a pressure difference typically being smaller than 1 bar, recirculation of filtrate, if implemented, is stopped, and the filtration as disclosed above is carried out, provided that the filtrate quality is sufficient.

It should be noted, that design of the filtration cake 10 can be performed with other pressure profiles than what is disclosed in FIG. 6. For instance the step wise increase and decrease of pressure difference disclosed in FIG. 6 may be replaced by smooth pressure transitions and a repetition of phase A and B may also be applied even with different levels of pressure differences in the consecutive phases A and B. When such measures are applied, a further control of the filter characteristics may be applied. For instance, by having a very short consecutive phase B with a relatively high pressure difference, the innermost part of the filtration cake 10 would get relatively more compressed than if the pressure difference was lower.

Replacement—or in general renewal—of the filter or filter cake 10 is performed at $t=t_4$ from which a new design phase is initiated after removal of the filtration cake 10. Thus, at $t=t_4$ the cycle comprising phases A, B and C is repeated as indicated in the figure. Phase A and B are in the time range of seconds to minutes, whereas phase C is in the range of minutes to hours.

It is noted that FIG. 6 does not disclose the time needed for and the pressure during replacement (renewal) of the filter or filter cake 10. In practical implementations $t_1'$ is not coinciding with $t_4$ as indicated in FIG. 4 as $t_1'$ is a point in time occurring after $t_4$. However for the sake of clarity, the pressure difference over the support structure 20 is not disclosed.

Figure 7:
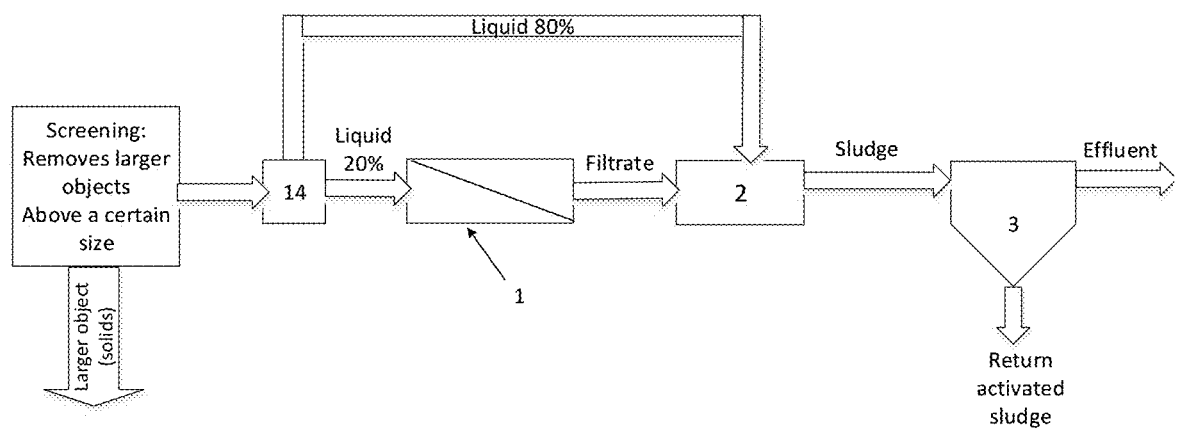
FIG. 7 is a schematical illustration of a further embodiment of a water treatment system according to the present invention.

In further embodiments of the invention, the system further comprises a fluid dividing device 14 dividing the wastewater to be treated into at least two streams of wastewater, one stream goes into the filtration device 1 and one stream goes into biological treatment device 2. This is indicated in FIG. 7 and the set-up has inter alia the advantage that as the filtering device lowers the content of organics and nutrients in the filtered wastewater, the overall load on the biological treatment device 2 is lowered. This can be used either to make the biological treatment device 2 smaller, or the overall capacity (e.g. in tons of wastewater treated per hour) increased. The ratio "liquid 80%" and "liquid 20%" indicated in FIG. 7 is a preferred range per volume and the invention is not limited to this ratio.

Typically, the fluid dividing device 14 is adapted to divide the wastewater into two streams at a volume ratio of 10% to filtration device 1 and 90% biological treatment device 2, such as 20% to filtration device 1 and 80% to biological treatment device 2, preferably 30% to filtration and 70% to biological treatment device 2. The actual ratio is defined by the mass balance of solids in the system and selected so that the ratio being pre-filtered matches the amount of surplus sludge produced in the biological treatment device 2 and that the pre-filtration does not deplete solids from the biological treatment device 2. The fluid dividing device 14 is formed by a system of valves controlling the amount of liquid flowing through different tube branches.

As indicated in particular with reference to the FIG. 5, the connections between the various elements of the wastewater treatment system may desirably be disconnectable or closable. Thus, the fluidic connectable connections may advantageously comprise valves for controlling the flow through such connections. E.g. there may be a valve in outlet 16 of FIG. 1A and in inlet 15 of FIG. 1A.

Figure 10:
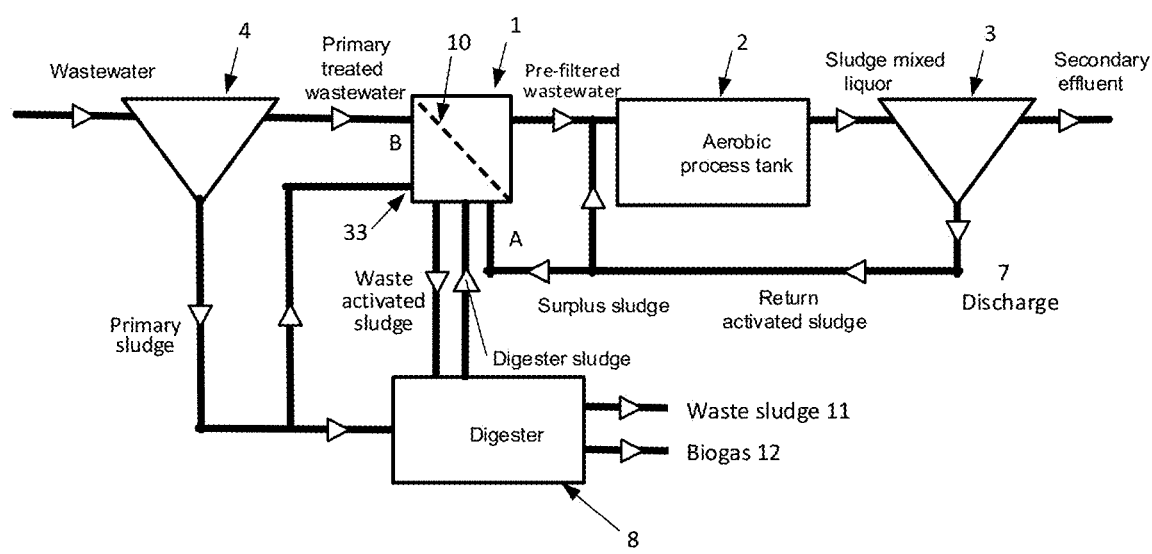
FIG. 10 is a schematical illustration of a water treatment system according to a further preferred embodiment of the invention.

The screening device arranged upstream of the filtering device 1 as illustrated in FIGS. 5 and 7, is preferably adapted to carry out a filtering-out of objects above a pre-selected size, such above 2 mm, preferably above 5 mm, such as above 10 mm, from the wastewater prior to be fed into the filtering device 1. The screening device may be embodied as a mechanical filter including a mesh having openings allowing the desired filtering. A screening device is also shown in FIG. 10, where a sedimentation tank 4 provides primary treated wastewater for the pre-filtering device, and primary sludge.

As outlined herein, a water treatment system may comprise a separator 3 separating the sludge formed in the biological treatment device 2 into an effluent and activated sludge having a higher dry matter content than the effluent. Solids of the activated sludge are preferably the solids to be deposited on the tubular element 21.

Providing a filtration cake 10 of a support structure 20 as disclosed herein for filtering wastewater through the filtration cake 10, may typically include the following steps. It is noted that the fluid penetrable support structure 20 is being provided as one or more tubular elements 21 and in such a situation, the filtration cake may advantageously be provided by:

feeding sludge formed in a biological treatment device 2 into the interior of the tubular element(s) 21, an accumulation phase A comprising accumulating activated sludge flocs and/or coagulated substances on the interior surface of the tubular elements 21 by inducing a pressure difference to generate a flow of sludge, towards and through fluid penetrable support structure 20 until a layer of flocs has been established on the interior surface of the support structure 20 a compression phase B comprising increasing the pressure difference to a level being sufficient to compress the layer of accumulated flocs on the support structure 20 into a filtration cake 10, characterized by, the filtration cake being provided from activated sludge flocs and/or coagulated substances formed in a biological treatment device 2 arranged upstream or downstream of the support structure 20.

Preferably, the pressure difference during the accumulation phase (A) is below 1 bar, such as below 0.5 bar, or even lower than 0.1 bar, and the pressure difference during the compression phase B is above the pressure difference of the accumulation phase A and below 2 bar, such as below 1 bar, or even below 0.3 bar. The pressure difference during the accumulation phase A is either constant over time or increased over time.

In some preferred embodiments, the pressure difference during the accumulation phase A and/or the compression phase B is/are provided by a hydrostatic pressure difference, e.g. provided by arranging an outlet of the filtering device 1 at lower level than an upper surface of the sludge, by pressurising the sludge, and/or providing a suction at the outlet.

After having been in an operation mode C for a period, the filtration cake 10 is renewed by removing the filtration cake, and the accumulation phase A and compression phase B are carried out again.

The sludge fed into the interior of the tubular elements 21 may advantageously be provided by separating the sludge formed in the biological treatment device 2 by use of a separator 3 into an effluent and activated sludge having a higher dry matter content than the effluent. Solids of the activated sludge is the solids to be deposited on the tubular elements 21.

The system disclosed above may be used in the following manner during filtration of wastewater. Initially, a filtration cake 10 is provided. Once the filtration cake 10 is provided, filtering the wastewater through the filtration cake 10 may be commenced and the filtered wastewater is subjected to biological treatment in the biological treatment device 2. When the filtration cake is fouled by organics and/or nutrient to an extent where e.g. the pressure difference across the filtration cake 10 reaches a level no longer being feasible, the filtration cake 10 is removed.

It is noted that the biological processing in biological treatment device 2, although not receiving any filtrate during the cake renewal process, continues to treat the material contained in the treatment device 2. In addition, a number of filtering devices 1 (or support structures 20) will typically and preferably be applied in parallel and some of the filtering devices 1 (or support structures 20) are continuing filtering while others have their cake renewed. Further, and depending on how the filtration cake renewal process is carried out, a flow of liquid may be present from the filtration device 1 and to the biological treatment device 2.

In embodiments including a digester, the removed filtration cake 10 may advantageously be fed to a digester 8. In addition, the method may further comprise separating from the content in the digester 8:
  reject water 13 and feeding is to the biological treatment device 2,
  waste sludge 11,
  biogas 12.

In the embodiment including the separator 3, the wastewater treatment may further comprise separating the sludge formed in the biological treatment device 2, by use of the separator 3, into at least two fractions, an effluent 6 and a discharge 7 (the effluent has a lower content of solids than the discharge). The discharge 7 of the separator 3 is typically fed into the biological treatment device 2 during filtration or into the support structure 20 for providing of a filtration cake 10.

The wastewater treatment method may also comprise the step of dividing the wastewater into two streams (when screening is applied, the division takes typically place downstream of the screening) and feeding one stream to the filtering device 1 and feeding the other stream into the biological treatment device 2.

Figure 8A:
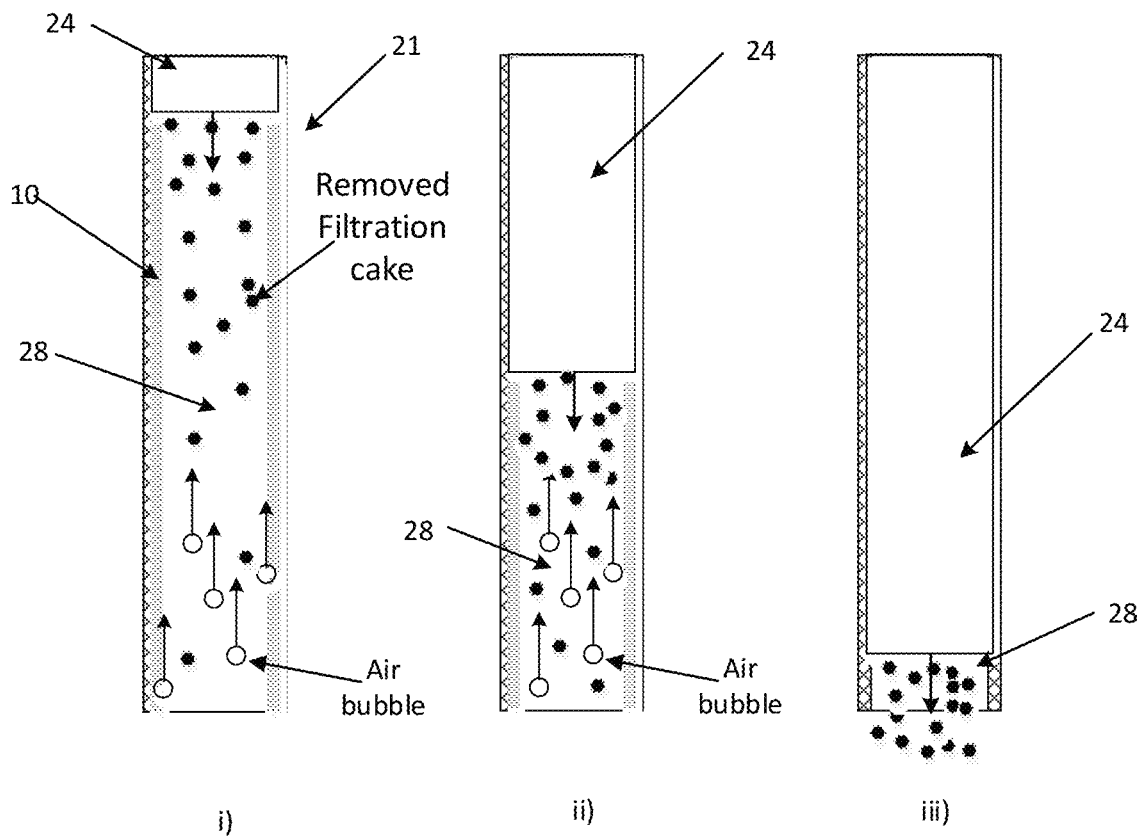
FIG. 8A illustrates a first step in removal of a filtration cake and FIG. 8B illustrates a subsequent step in removal of a filtration cake.

Reference is made to FIG. 8A which shows a first embodiment of removing a filtration cake 10 from the support structure 20 formed as a tubular element 21. As shown in FIG. 8A the process resides inter alia in that the tubular element 21 is arranged vertically with an upper end defined as the upper extremity of the tubular element 21 and a lower end defined as a lower extremity of the tubular element 21. The method of removing a filtration cake 10 may preferably comprise the steps of
  introducing gas bubbles, such as air bubbles, into the tubular element 21 at a lower end thereof, and
  arresting the introduced gas bubbles inside the tubular element by closing the upper end of the tubular element(s) (21)
until a slug of gas 24 has formed occupying the entire void 28 inside the tubular element 21.

As disclosed in FIG. 8A, the gas bubbles (which advantageously may be atmospheric air) rises upwardly inside the tubular element 21 and during their passage upwardly releases filter cake matter from the inside of the tubular elements 21. The upwardly going motion of both the air bubbles and the fluid will tear off the filtration cake 10 and the tearing off is, typically, increased by the pockets 29 present in the inner layer 22 which generates turbulence assisting in the tearing off. During this, the upper end of the tubular element 21 is closed so that air bubbles are collected as a slug of gas (an air pocket) at the upper end. Thus, As the gas bubbles are arrested inside the tubular element 21 by the closure of the upper end of the tubular element 21, a slug of gas (air) 24 will form at the upper end, which slug of gas 24 will gradually expand downwardly towards the bottom of the tubular element 21 forcing released and free floating filtration cake matter out of the lower end of the tubular element 21.

In a preferred embodiment, the gas bubbles are arrested by closing the inlet 15 of the filtering device 1 (see e.g. FIG. 1 or 3) for receiving liquid to be filtered, e.g. by using a valve.

The amount of air to be introduced during the process outlined in FIG. 8A where the slug of gas 24 forces released and free floating filtration cake matter out of the lower end of the tubular element 21 is found to be in the order of the internal volume of the tubular element 21, that is a volume of $Pi/4*D^2*L$ (see FIG. 2 for D and L). However, in situations where gas (air) escapes through the inner and outer layers 22, 23 of the tubular elements a surplus of gas should be introduced for making up the escaped amount. Preferred flow rates applicable for introducing air (gas) is in the region of 0.1-0.4 $m^3/h$, such as 0.2-0.3 $m^3/h$. However, other flow rates are applicable. It is noted that the flow rates are giver per tubular element 21 and in embodiments where more than one tubular element 21 is used, the amount is scalable by multiplication with the number of tubular elements.

The efficiency of filtration cake removal may be enhanced by preventing fluid flow through the fluid penetrable support structure 20. Such prevention may advantageously be provided by establishing a zero pressure gradient between the interior and outside of the support structure 20.

During the cake removal, the outer layer 23 of the support structure 20 (which may be referred to as the clean side) is kept primed typically by assuring that liquid is present in the outer layer 23 of the tubular element 21 while only the connection to the inside of the tubular element 21 at the bottom is open—this way the water from the clean side i.e. in cavity 27, does not penetrate into the interior of the tubular element 21 (assisted by surface tension of the liquid in out layer 23) and re-suspended solids (filtrate cake material) are pushed out by an size-increasing slug of gas (air) (see FIG. 8A) acting like a gas piston.

A further enhancement of the filtration cake removal has the further effect of preparing the tubular element 21 for having a filtration cake provided comprising subsequently to the formation of a slug of gas 24 occupying substantially the entire void 28 in the tubular element 21:

establish a flow of sludge inside the tubular element 21 along its longitudinal axis from bottom to top of the tubular element 21, while injecting gas, preferably atmospheric air, in a ratio to allow formation of portions of sludge 25 neighbouring by slugs of gas (24).

enabling back-flow of filtrate into the inside of the tubular element 21 (in the direction from outside through layers 23 and 22 to the void 28 and through 22).

The injection of gas, in a ratio to allow formation of portions of slugs is preferably carried out by injecting gas (at the bottom of the tubular element 21) in a pulsed manner, that is alternatingly injecting gas and not injecting gas. Preferred flow rates applicable for injecting gas (air) is in the region of 0.1-0.4 $m^3/h$, such as 0.2-0.3 $m^3/h$. Also in this case, the flow rates are giver per tubular element 21 and in embodiments where more than one tubular element 21 is used, the amount is scalable by multiplication with the number of tubular elements. Preferred pulse rates are between 0.5 and 5 Hz such as between 1 and 3 Hz. By a pulse rate of e.g. 2 Hz is meant that for a period of e.g. 0.5 Hz is preferably meant that for a period of 1 second length, gas is introduced followed by a period of 1 second length where no gas is injected. As another example, gas is introduced for 0.4 s and switched off for 1.6 s. In another example, the rate is 1 Hz, and gas is introduced for 0.2 s and switched off for 0.8 s. However, other flow rates and pulse rates are applicable.

It is noted that the flow of sludge inside the tubular element 21 may comprise a tangential velocity component so that the flow is spiralling upwardly.

Figure 8B:
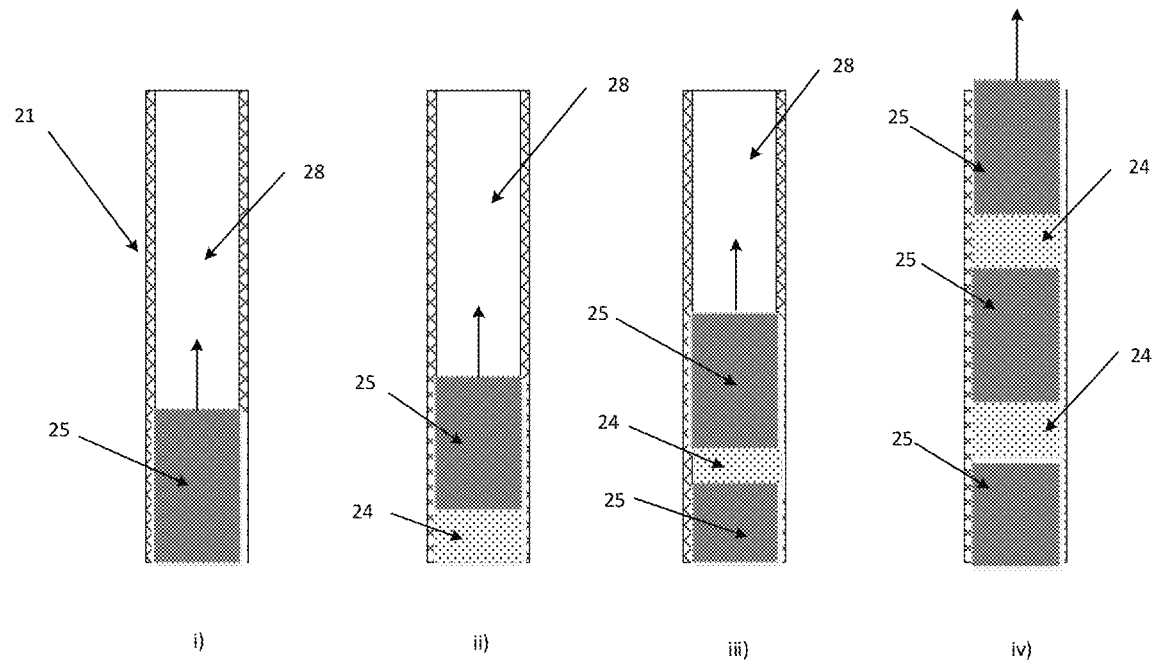

This is disclosed schematically in FIG. 8B where FIG. 8Bi shows an initial feeding of sludge into the tubular element 21 from below. FIG. 8*bii* shows a subsequent step of introducing air in a manner so as to form air slugs. FIG. 8Biii shows the process at some time instant later than what is shown in FIG. 8Bii. Finally FIG. 8Biv shows that the interior of the tubular element 21 is occupied by portions of sludge 25 with neighbouring slugs of gas (air) 24.

The result of this is that the interior of the tubular element 21 is occupied (except from the space taken-up by the slugs of gas 24) by sludge which can be used as depositing material for building the filtration cake 10 on the inside of the tubular element 21 in the subsequent cake formation phase. Prior to the next cake formation phase the air flow is stopped while sludge still being recirculated, which fills the entire void with sludge.

Figure 9:
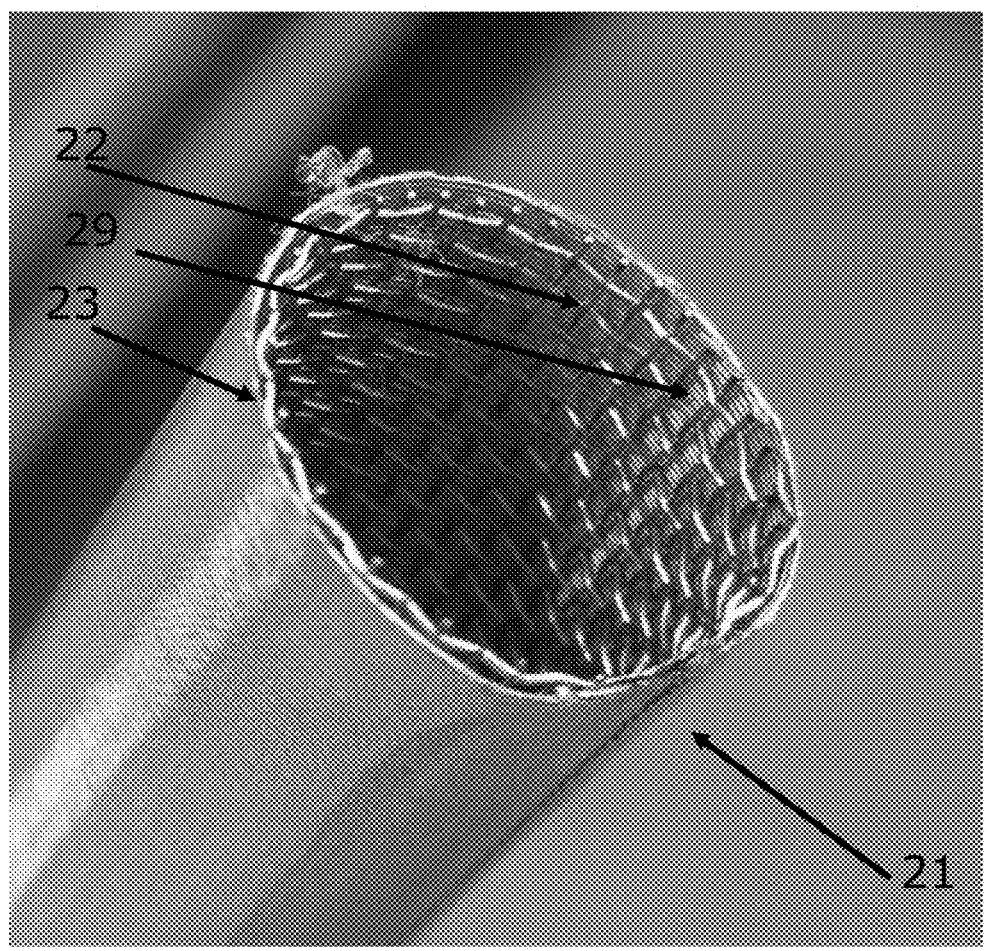
FIG. 9 is a photographic illustration of the double-layered structure of one filtration support elements.

In FIG. 9 a tubular element 21 is partly pictured as a photograph showing the end of the tubular element 21. From this figure, it is clearly seen that the inner layer 22 is may be formed by a coarser mesh or pockets 29 having a larger cross sectional area than the outer layer. Thus, the filtration cake 10 provided on the inside of the support structure 20 extend into the interior of the support structure 20, preferably only into pockets 29 formed in the inner layer 22.

FIG. 10 shows a water treatment system according to preferred embodiments of the present invention. The description of FIG. 4 also applies to FIG. 10. However, the system in FIG. 10 illustrates additional sources of material for forming the filtration cake. In some embodiments, the pre-filtering device has a primary sludge inlet 33 for receiving primary sludge, for instance from a sedimentation tank 4 as shown in FIG. 10. Preferably, the flow of primary sludge into the pre-filtering device is controllable. Primary sludge is generated in primary clarification—a settling tank (or other means, e.g. band filter) processing raw wastewater and generating 'Primary-treated wastewater' and 'Primary sludge'. Digester sludge is the product of digesting surplus sludge and primary sludge, essentially the leftover solids generated by the digester.

In some embodiments, digester sludge can flow from the digester 8 to the pre-filtering device. Preferably, the flow of digester sludge into the pre-filtering device is controllable.

Such embodiments make it possible to create the filtration cake with a blend of any of the three sludge sources: surplus (activated) sludge, primary sludge and digester sludge. This way, functional cakes with much less surplus (activated) sludge can be created, meaning that the supply of cake material becomes much less dependent on the amount of organics available to the aerobic biological process.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

LIST OF REFERENCES USED 1 filtering device
2 biological treatment device
3 separator
4 sedimentation tank
6 effluent
7 discharge
8 digester
9 outlet (filtrate) from filtering device
10 filtration cake
11 waste sludge
12 biogas
13 reject water
14 fluid dividing device
15 inlet to filtering device
16 residue outlet from filtering device
17 casing
20 (fluid penetrable) support structure
21 tubular element
22 an inner layer
23 an outer layer
24 slug of gas (air)
25 portion of sludge
26 dividing wall
27 cavity in filtering device
28 internal void in tubular element
29 pocket
30 nozzle 31 manifold
32 opening
33 primary sludge inlet
D Internal diameter of tubular element 21
L Length of tubular element 21

The invention claimed is:

1. A water treatment system comprising a filtering device, the water treatment system comprising:
a biological treatment device configured to provide a sludge from wastewater or filtrated wastewater and a digester adapted to provide digester sludge, the biological treatment device being fluidic connectable to or in fluid communication with the filtering device for receiving filtrated wastewater from the filtering device and/or for delivering sludge to the filtering device, and the digester being in direct fluid communication with the filtering device for delivering digester sludge directly from the digester to the filtering device,
wherein
the filtering device is a cake filtration device comprising a fluid penetrable support structure, the support structure being provided as one or more tubular elements, the filtering device comprising:
an inlet being connectable to receive liquid to be filtered so that the flux direction of liquid to be filtered is from an interior of the tubular element, through the filtration cake and to the outside of the tubular element thereby providing a filtrate,
an outlet for outletting liquid from the interior of the tubular element,
a filtrate outlet for outletting filtrate from the filtering device, and
the filtration cake being provided on the inside of the fluid penetrable support structure during use by deposition of solids from the sludge formed in the biological treatment device and in the digester, wherein the solids comprise digester sludge and at least one of activated sludge flocs and coagulated substances.

2. The water treatment system according to claim 1, wherein the filtering device further comprises a fluid tight casing encapsulating the support structure and providing a cavity outside the support structure in fluid communication with the filtrate outlet.

3. The water treatment system according to claim 1, wherein each of the tubular elements comprising an inner layer and an outer layer being concentrically arranged, wherein each layer comprises through-going openings, and the through-going openings in the inner layer has a larger cross sectional area than the through-going openings in the outer layer.

4. The water treatment system according to claim 1, wherein the tubular element(s) is(are) cylindrical element(s) having an internal diameter less than 15 mm.

5. The water treatment system according to claim 1, comprising a plurality of tubular elements, which are arranged in parallel having a common inlet for receiving wastewater to be treated.

6. A water treatment system comprising the filtering device according to claim 1, wherein the filtrate outlet of the filtering device is fluidic connected to a downstream biological treatment device.

7. A water treatment system comprising the filtering device according to claim 1, wherein the inlet of the filtering device for receiving liquid to be filtered is fluidic connected or fluid connectable to an upstream biological treatment device.

8. The water treatment system according to claim 6, wherein the system further comprises a screening device arranged upstream of the filtering device, said screening device being configured to carry out a filtering-out of objects above a pre-selected size from the wastewater prior to be fed into the filtering device.

9. The water treatment system according to claim 6, wherein the water treatment system comprises a separator separating the sludge formed in the biological treatment device into an effluent and activated sludge having a higher dry matter content than the effluent.

10. A method for providing a filtration cake on a support structure of the filtration device according to claim 1, comprising:
feeding solids comprising digester sludge and at least one of activated sludge flocs or coagulated substances,
an accumulation phase comprising accumulating activated sludge flocs and/or coagulated substances on the interior surface of the tubular elements by inducing a pressure difference to generate a flow of sludge, towards and through fluid penetrable support structure until a layer of flocs has been established on the interior surface of the support structure,
a compression phase comprising increasing the pressure difference to a level being sufficient to compress the layer of accumulated flocs on the support structure into a filtration cake,
wherein,
the filtration cake is provided from activated sludge flocs and/or coagulated substances formed in a biological treatment device arranged upstream or downstream of the support structure.

11. The method according to claim 10, wherein the sludge fed into the interior of the tubular elements are provided by separating the sludge formed in the biological treatment device by use of a separator into an effluent and activated sludge having a higher dry matter content than the effluent.

* * * * *